(No Model.)
J. H. HELM.
GAS REGULATOR.
No. 354,017.
2 Sheets—Sheet 1.
Patented Dec. 7, 1886.
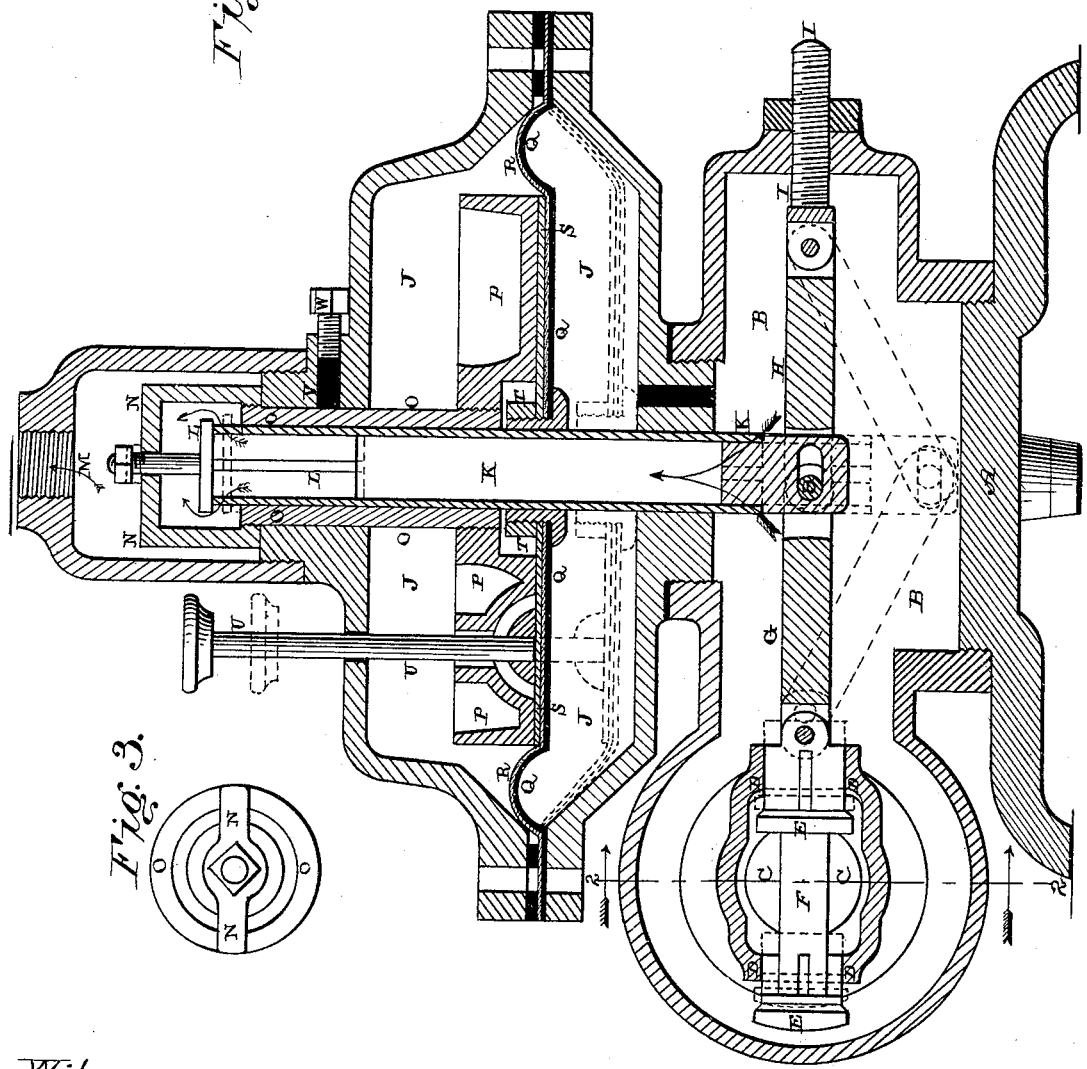
Witnesses
Wm. J. Danner
A. W. Brecht
Inventor.
J. H. Helm,
By F. A. Lehmann,
Attorney (No Model.) 2 Sheets—Sheet 2.
J. H. HELM.
GAS REGULATOR.
No. 354,017. Patented Dec. 7, 1886.
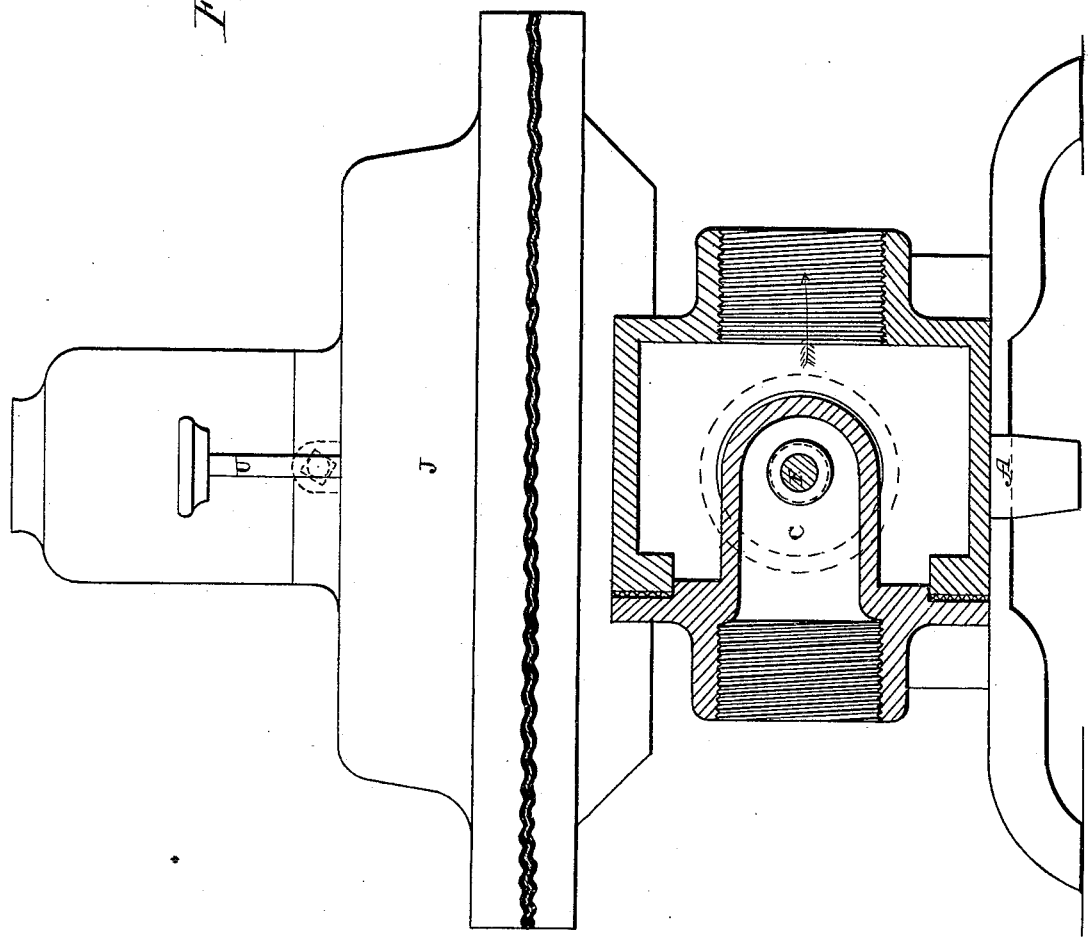

UNITED STATES PATENT OFFICE.

J. HENRY HELM, OF ALLEGHENY, PENNSYLVANIA.

GAS-REGULATOR.

SPECIFICATION forming part of Letters Patent No. 354,017, dated December 7, 1886.

Application filed September 25, 1886. Serial No. 214,515. (No model.)

*To all whom it may concern:*

Be it known that I, J. HENRY HELM, of Allegheny, in the county of Allegheny and State of Pennsylvania, have invented certain new and useful Improvements in Gas-Regulators; and I do hereby declare the following to be a full, clear, and exact description of the invention, such as will enable others skilled in the art to which it pertains to make and use it, reference being had to the accompanying drawings, which form part of this specification.

My invention relates to an improvement in gas-regulators; and it consists in, first, the combination of the two valves placed upon the same stem, two valve-seats, two links, which are coupled together, a tube or rod, which is connected to the inner ends of the links, and which tube or rod has the diaphragm secured thereto, the lower end of the tube or rod being slotted, so that when the gas is cut off in the main the diaphragm will sink and cause the links to close the valves; second, the combination of the inlet, the two valve-seats, two valves, which are placed upon the same stem, links, which are loosely connected together, and which operate the links, a tube, which is connected at its inner end to the inner ends of the links, the diaphragm, and the weight placed thereon, with a relief-valve, which is placed upon the top of the tube; third, a diaphragm, which is composed of separate pieces of canvas and pure sheet-gum, which are placed one upon the top of the other, the gum being placed below, so as to come in contact with the gas; fourth, the combination of the case, having an opening through it, the tube, which is connected with the diaphragm, and a suitable friction device, which is passed through the side of the casing for the purpose of preventing any vibrating movement of the tube which is connected with the diaphragm; fifth, in the arrangement and combination of parts, which will be more fully described hereinafter.

The object of my invention is to provide a gas-regulator which is intended especially to control the pressure of natural gas, and in which the parts are so constructed that when the pressure is shut off from the main the valves will be automatically closed, so as to prevent any leakage at the burners when the gas is again turned on, in which the diaphragm is prevented from vibrating, owing to the different pressures of gas in the main, and which is provided with a safety-valve to allow all possible leakage to freely escape.

Figure 1 is a vertical section of a gas-regulator embodying my invention. Fig. 2 is a vertical section taken upon the lines 2 2 of Fig. 1. Fig. 3 is a detail view.

A represents a suitable base, upon which the chamber B is placed. This chamber is provided with a suitable inlet, C, (shown in Fig. 2,) and with the valve seats D, which are placed upon a horizontal line with each other. The two valves E may either be of the same size or of different sizes, as may be preferred, and are placed upon the same valve-stem F, so as to always move together. The inner end of this valve-stem F is loosely connected to the link G, which is connected at its inner end to a second link, H. These two links G H are loosely pivoted together at their inner ends, at which point they have a rising and falling movement for the purpose of moving the valves E horizontally, and thus causing them to open or close, according as the gas is to be turned on or cut off. The outer end of the link H is connected to a screw-rod, I, which passes through one side of the chamber B, and which is held rigidly in place by means of a jam-nut outside of the chamber. By making this screw-rod threaded it can be adjusted back and forth through the side of the chamber, and thus regulate the amount of movement that shall be given to the inner end of the links and the distance that the diaphragm shall be moved.

Screwed into the top of the chamber B is the diaphragm-chamber J, which has an opening through its bottom to allow the gas to pass through and exert its pressure against the under side of the diaphragm. This chamber J is made in two parts, as shown, and which when clamped together hold the edges of the diaphragm between them. The edges of these two parts of the chamber, where they come together, are made corrugated, as shown in Fig. 2, for the purpose of contracting the diaphragm around its outer edge, and thus causing the diaphragm to dish. This dishing of the diaphragm allows the diaphragm a suitable movement for the purpose of operating the valves, and thus controlling the pressure of the gas.

Passing up through the bottom of the chamber J is the pipe or hollow stem K, which has a horizontal slot made through the solid portion of its lower end, and through which slot passes the pivotal pin *a*, which connects the two links G H together. This portion is slotted for the purpose of allowing the pin a necessary lateral motion and the rod or stem K to freely move with the links as they rise or fall at their inner ends. The stem or tube K is open at its lower end, so that the gas can freely pass up into it, and which is closed at its upper end by the weighted valve L. As long as the pressure of the gas does not exceed the weight of this valve no gas escapes from the upper end of the stem; but when the pressure of the gas becomes excessive this valve is raised from its seat, and then the gas escapes through the opening M, which is connected with the atmosphere. The stem of this valve L passes through the stirrup N, which is connected with the upper end of the sleeve O, which is connected with the diaphragm-weight P, and which sleeve acts as a guide for the movement of the stem or tube K.

The upper end of the stem of the valve is provided with a nut which allows the valve L to sink downward but a comparatively slight distance as compared with the movement of the tube or stem K, and hence when the diaphragm, tube, and links sink downward, as is shown in dotted lines in Fig. 1, the valve L remains suspended in the air, leaving the upper end of the tube K open, so that in case there should be any leakage through the valves E this leakage will pass through the pipe K and the opening M and escape. By means of this construction an absolute safeguard is provided for any leakage which may occur, and thus should any gas escape the valves it will not pass through the burners and into the house.

The diaphragm is composed of a sheet of pure gum, Q, or other flexible gas-tight material, and one or more sheets of canvas, R, which are placed one upon the other, as shown, the gum being placed below, so as to come in contact with the gas, and thus prevent leakage. The canvas gives the gum the necessary strength and prevents it from being injured. The gum and canvas are not cemented or otherwise connected together, but are separate and independent in every way.

Upon the top of the canvas is placed a light sheet-metal plate, S, with which the canvas and the gum are clamped by means of a suitable nut, T, at their inner edges upon the shoulder which is formed upon the outside of the stem or tube K. The diaphragm is thus secured to the stem or tube, so as to move with it. The weight P, which may either be of the construction here shown or any other that may be preferred, is placed upon the top of the plate S, and is connected by a screw-thread with the lower end of the sleeve O.

The stirrup N upon the upper end of the sleeve O forms a shoulder, which catches upon the top of the chamber K and prevents the diaphragm-weight from dropping down below the position shown in Fig. 1. Should the pressure of the gas in the main at any time be cut off while the burners are open, the weight of the links, the tube K, and the diaphragm will cause these parts to sink down in the bottom of the chamber B, as shown in dotted lines in Fig. 1, and thus instantly close the valves E. The valve L is then left suspended in the air, as above described, and in case of any leakage of gas into the chamber B this gas passes off through the tube and the opening M without exerting any pressure against the under side of the diaphragm for the purpose of raising it up into an operative position.

Connected to the plate S is a rod, U, which extends up through the top of the case J, by means of which the diaphragm, tube K, and the links G H can be raised upward and the valves E opened, in order to start the flow of gas to the burners after the gas has again been turned on in the main. As long as there is no pressure in the main the diaphragm, tube, and links drop downward, so as to prevent any possibility of the gas passing to the burners after the gas has again been turned on in the main. As long as the pressure of the gas remains in the main the tube, diaphragm, and links cannot sink downward, as shown in dotted lines, for the purpose of closing the valves.

The operative pressure per square inch upon the diaphragm is determined by the weight of the links G H, stem K, weights S P, sleeve O, and valve L. The weight P and sleeve O are not rigidly attached to the other parts, but are carried by the plate S, while the plate is above the position shown in Fig. 1; but when the plate S sinks downward with the diaphragm the weight, sleeve, and valve L all remain suspended upon the collar N. If all of these parts were connected together, as soon as the pressure of the gas became less than the combined weights, it would shut off the gas, thus causing much inconvenience. To prevent the pressure from being cut off when a very light pressure is in the main, these two weights are made entirely separate. When the pressure becomes so light that it will not hold up the diaphragm, tube, links, and stem U, then this light weight shuts off the gas entirely, but not until then.

In order to prevent the fluttering or vibrating of the diaphragm, which is liable to occur, and to which so many of the gas-regulators are subject, and thus cause a very uneven supply of gas and much wear and tear of the valves, there is made an opening through the top of the case J, and in this opening there is placed a packing of rubber or any other suitable substance, V, which is made to bear against the sleeve O by means of the set-screw W. This packing V exerts just sufficient pressure against the side of the sleeve O to prevent the parts from vibrating or fluttering, and yet does not prevent the pressure of the gas from raising the weight P and causing the sleeve to slide past the packing when the pressure of the gas raises the diaphragm upward. I have discovered that by exerting a slight pressure against the sleeve O by means of a packing all vibration or fluttering is absolutely stopped.

The operation is as follows: When the regulator is first applied to the pipe, and before the gas is turned on, the diaphragm, stem U, tube K, and the links G H all sink downward into the position shown in dotted lines, for the want of pressure to hold them up, and in sinking down they close the two valves E, so as to keep out the gas and leave the valve L open, so that all gas which may leak past the valves E will escape at M. The weight P remains suspended in the position shown, being supported by the sleeve O and collar N. When the gas is to be admitted, a person pulls up upon the stem U, so as to raise the diaphragm, tube, and links, and thus open the valves E, and then the pressure of the gas against the under side of the diaphragm raises all of the parts into an operative position and closes the valve L. Should the gas be turned off from the main at any time, or the pressure from any cause sink below what is necessary to support the diaphragm and its operating parts, they will sink into the position shown in dotted lines, and thus shut off the gas altogether. Should the pressure of the gas at any time become too great, the diaphragm and weight P in moving upward will cause the valves E to partially close, and thus decrease the amount of gas passing through the regulator. The gas passes out of the regulator, as shown by the arrow in Fig. 2.

Having thus described my invention, I claim—

1. In a gas-regulator, the combination of the valve-seat, a means for controlling the flow of gas, the links G H, connected directly to the valve, the tube or rod, and the diaphragm, the lower end of the tube or pipe being slotted, whereby the diaphragm, tube, and links can sink downward from their own weight for the purpose of closing the valve, substantially as shown.

2. In a gas-regulator, the combination of the valve E, the two links G H, connected directly to the valve, the screw-rod I, which is passed through the side of the casing, the tube or pipe K, provided with a slot at its lower end, the diaphragm, which is connected to this pipe, and the stem U, substantially as described.

3. A diaphragm for gas-regulators, composed of a sheet of pure gum, Q, and the canvas R, the two parts being entirely separate and distinct, substantially as set forth.

4. In a gas-regulator, the combination of a valve, E, the links, the tube K, the safety-valve provided with a stem, and a support, N, for supporting the safety-valve, substantially as specified.

5. In a gas-regulator, the combination of the valve E, the links G H, the stem or pipe, and the diaphragm, with a separate and independent weight which has a vertical play of its own, substantially as shown.

6. In a gas-regulator, the combination of the diaphragm, the pipe or stem to which it is attached, the links, the valve, and the valve-seat, with the weight P, and the sleeve O, provided with shoulders at its upper end to prevent the weight P from dropping down below a certain point, substantially as described.

7. In a gas-regulator, the combination of the diaphragm and its attachments, the weight P, and sleeve or extension extending up from the weight, a packing, and a screw for exerting a pressure upon the extension, substantially as set forth.

8. The combination of the chamber J, having its edges corrugated, with a diaphragm which has its outer edges clamped between the edges of the case, substantially as specified.

9. In a gas-regulator, the combination of a valve, E, connecting-links, arranged as described, for operating the valves, a diaphragm, and its attachments, which are made separate and independent from the diaphragm-weight, whereby when the pressure in the main is cut off the diaphragm will automatically close the valves, substantially as shown.

10. In a gas-regulator, the combination of a separate and independent weight, P, which has a limited downward movement, with a diaphragm and its attachments, and a stem which is connected to the diaphragm and extends through the case, whereby when the diaphragm falls for the purpose of closing the valves it can be brought into action again by means of the stem, substantially as described.

11. The combination, in a gas-regulator, of a diaphragm, a weight placed thereon, and a friction mechanism for exerting a pressure against an extension upon this weight for the purpose of preventing it from fluttering, substantially as set forth.

In testimony whereof I affix my signature in presence of two witnesses.

J. HENRY HELM.

Witnesses:
 F. A. LEHMANN,
 M. A. BALLINGER.